US008688311B2

(12) United States Patent
Shelcusky et al.

(10) Patent No.: US 8,688,311 B2
(45) Date of Patent: Apr. 1, 2014

(54) APPARATUS FOR SIMULATING A VEHICLE ENVIRONMENT

(75) Inventors: Darren Peter Shelcusky, Saline, MI (US); Mark Allen McClure, Plainwell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/473,916

(22) Filed: May 17, 2012

(65) Prior Publication Data

US 2013/0311032 A1 Nov. 21, 2013

(51) Int. Cl.

*G01M 17/00* (2006.01)
*G06F 7/00* (2006.01)
*G06F 11/30* (2006.01)
*G06F 19/00* (2011.01)
*G07C 5/00* (2006.01)

(52) U.S. Cl.

USPC .......................................... 701/29.1; 701/29.4

(58) Field of Classification Search

USPC .................... 701/29.1, 1, 31.4, 45, 32.9, 343; 717/106; 702/123; 703/8; 434/29

See application file for complete search history.

(56) References Cited

U.S. PATENT DOCUMENTS

| | | | | |
|---|---|---|---|---|
| 5,660,547 | A * | 8/1997 | Copperman | 434/29 |
| 8,161,454 | B2 * | 4/2012 | Srinivasan et al. | 717/106 |
| 8,204,711 | B2 * | 6/2012 | Colmenares | 702/123 |
| 8,296,111 | B2 * | 10/2012 | Moriyama | 703/8 |
| 2011/0190972 | A1 * | 8/2011 | Timmons et al. | 701/29 |
| 2012/0173044 | A1 * | 7/2012 | Srinivasan et al. | 701/1 |

OTHER PUBLICATIONS

Ford Motor Company, "SYNC with Navigation System," Owner's Guide Supplement, SYNC System Version 1 (Jul. 2007).
Ford Motor Company, "SYNC," Owners's Guide Supplement, SYNC System Version 1 (Nov. 2007).
Ford Motor Company, "SYNC with Navigation System," Owner's Guide Supplement, SYNC System Version 2 (Oct. 2008).
Ford Motor Company, "SYNC," Owner's Guide Supplement, SYNC System Version 2 (Oct. 2008).
Ford Motor Company, "SYNC with Navigation System," Owner's Guide Supplement, SYNC System Version 3 (Jul. 2009).
Ford Motor Company, "SYNC," Owner's Guide Supplement, SYNC System Version 3 (Aug. 2009).
Kermit Whitfield, "A hitchhiker's guide to the telematics ecosystem," Automotive Design & Production, Oct. 2003, http://findarticles.com, pp. 103.

* cited by examiner

*Primary Examiner* — Thomas Black
*Assistant Examiner* — Robert Payne
(74) *Attorney, Agent, or Firm* — Jennifer M. Steci; Brooks Kushman P.C.

(57) ABSTRACT

An apparatus includes a plurality of first inputs, corresponding to changeable vehicle state variables, manipuable to simulate changes in vehicle state. The apparatus includes a plurality of second inputs, corresponding to vehicle system controls, manipuable to simulate activation of vehicle controls. Also, in this embodiment, the apparatus also includes one or more bus inputs, configured to receive vehicle CAN bus signals and one or more bus outputs, configured to output vehicle CAN bus signals. Further, the apparatus includes a communication connection, configured to connect to a vehicle computing system module (VCSM) and to provide and receive signals from the VCSM allowing for testing of hardware and software in conjunction with the VCSM under various vehicle environments.

19 Claims, 2 Drawing Sheets

APPARATUS FOR SIMULATING A VEHICLE ENVIRONMENT

TECHNICAL FIELD

The illustrative embodiments generally relate to an apparatus for simulating a vehicle environment.

BACKGROUND

Vehicle computing systems, infotainment systems, etc. have come a long way in recent years. Capable of interaction with drivers, wireless devices, portable devices, remote servers, cloud networking, etc., these systems may have numerous and complex inputs.

Often times the systems are modular in nature as well, allowing portions thereof to be upgraded, changed, etc. Additionally, software packages can be developed for interaction with vehicle computing systems. When these upgrades or software packages are added to a relatively simple system, the process of testing and integrating the new modules can be performed with relative ease. As the complexity of the system increases, however, the testing process can grow in difficulty.

For example, if a new module or software package is to be deployed in a vehicle, it is important that the module/software/etc. not result in errors that could affect vehicle performance or cause driver distraction. Additionally, it is desirable to have the new module (used to represent software, hardware, etc.) work appropriately.

When testing at a vehicle OEM, demo vehicles may be available for use in the testing process. Offsite testing, however, and third party developer testing may not be as simple. Further, the number of possible inputs and reactions caused by a variety of input factors can result in potential overlooking of input combinations (and the subsequent module reaction) in a complex vehicle environment.

SUMMARY

In a first illustrative embodiment, an apparatus includes a plurality of first inputs, corresponding to changeable vehicle state variables, manipuable to simulate changes in vehicle state. The apparatus includes a plurality of second inputs, corresponding to vehicle system controls, manipuable to simulate activation of vehicle controls. Also, in this embodiment, the apparatus also includes one or more bus inputs, configured to receive vehicle CAN bus signals and one or more bus outputs, configured to output vehicle CAN bus signals. Further, the apparatus includes a communication connection, configured to connect to a vehicle computing system module (VCSM) and to provide and receive signals from the VCSM allowing for testing of hardware and software in conjunction with the VCSM under various vehicle environments.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
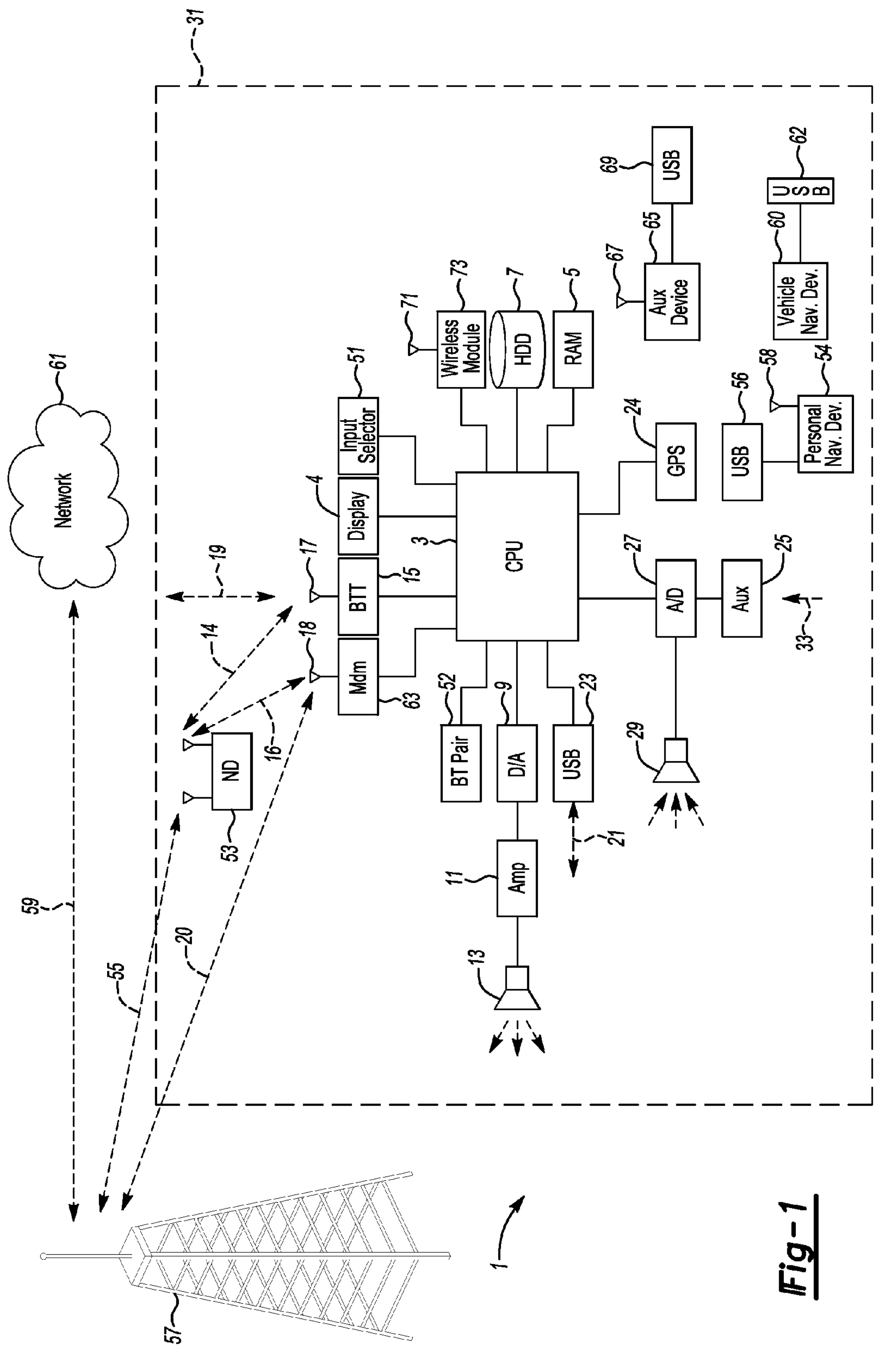
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domian Multiple Access (CDMA), Time Domain Multiple Access (TDMA), Space-Domian Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

In the interest of providing developers access to a system with the inputs and control factors of a vehicle computing system, a technology development kit (TDK) is envisioned. Providable with any of the input factors from a vehicle, this kit can be used to simulate real world environments in a portable package, without the need of a full vehicle on-site. Numerous and exemplary inputs and controls to a TDK are presented herein, which are exemplary, non-limiting representations of actual vehicle controls. It is contemplated that any control or input available in a vehicle can be replicated by implementation of embodiments of the invention.

Through use of the controls provided on the TDK, a developer can test operation of new hardware and software under various vehicle states. Inputs and outputs from the TDK can be used to change and measure responses of aspects of a simulated vehicle, so that proper module implementation can be relatively assured.

In the illustrative embodiments, a TDK is connected to a vehicle computing system, such as, but not limited to, the FORD SYNC system. Then the new software, for example, can be run on a wireless device connected to the SYNC system. Once the application is running (which may have been launched using controls on the TDK), controls on the TDK and inputs to the TDK can be used to alter simulated vehicle environments and recreate vehicle inputs so that the reactions of, in this case, the new software can be tested under varying conditions.

Figure 2:
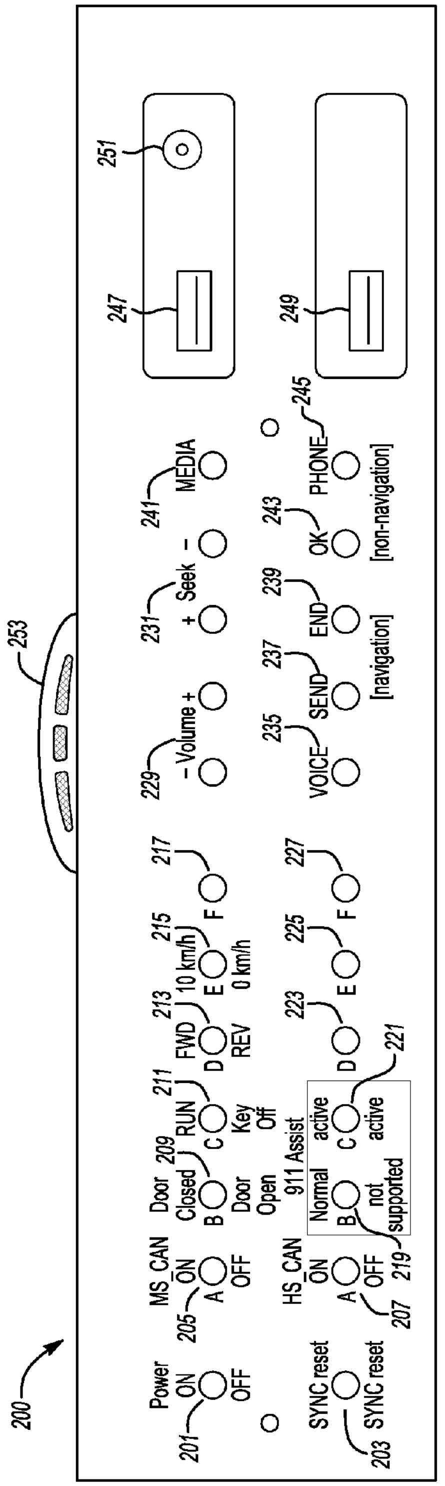
FIG. 2 shows an illustrative series of technology development controls.

FIG. 2 shows an illustrative series of technology development controls. This non-limiting example shows the front face of a TDK, provided with numerous controls. Of course, other suitable controls could be added (or removed) as appropriate. In this illustrative example, the TDK is provided with toggle switches corresponding to binary states, such as on/off. Toggles can also be used to increase or decrease incremental variables (such as, for example, vehicle speed). Other suitable switches or controls can be implemented as desired.

The TDK has a power switch 201, in this example, that controls the power to the unit 200. Toggling the switch can turn the power to the unit between on and off. Also, in this example, the switch includes a VCS reset switch 203. Upon actuation of this switch, the TDK can send an ECU reset signal to the VCS module connected to the TDK. Using the hard reset, the TDK can reset the module restoring any state changes made thereto to an original state. This could be useful, for example, if the module hangs during testing.

Also, the TDK includes an MS_CAN switch 205. This switch can open an MS_CAN bus simulator for signal transfer to a VCS. For example, without limitation, the bus can be used to send a "radio on" signal to simulate a radio being powered. Toggling the switch can enable or disable the MS_CAN bus signals. The TDK also includes a HS_CAN bus switch 207 for controlling signals on an HS_CAN bus simulator, similar to the MS_CAN switch 205.

In this example, the TDK also includes a door open/closed switch 209. Toggling this switch can be used to simulate the opening or closing of a door. In a first position, the door is treated as open, and in the second position, the door is treated as closed. Just as in an actual vehicle, the door open/closed state may have other effects on the overall system. For example, in this illustrative embodiment, if a key position switch 211 is in an "on" state, the process will provide a five second delay until power to the VCS is cut. If the key switch is in an "off" state, the power to the VCS may be cut immediately. This can help simulate what would happen with a key in various states if a door to a vehicle were opened.

As noted, the system includes a key switch 211 that can be used to simulate key powering. Based on, for example, other states of the vehicle (such as a door state) the results of toggling the key switch may vary as appropriate to simulate a vehicle environment.

Because a vehicle is a moving object, it may be useful to include one or more switches relating to moving states of a vehicle. For example, the TDK may include a vehicle direction switch 213. This can be used, for example, to toggle the simulated motion of a vehicle between a forward/neutral and a reverse state. As previously noted, switches and controls other than binary switches can be used, if, for example, forward, reverse and neutral were desired.

One area of concern to automotive manufactures implementing vehicle computing systems is driver distraction. That is, certain features of systems may be disabled or limited based on vehicle speeds, directions of travel (e.g., reverse), etc. In one example, a threshold speed, such as, but not limited to, 10 km/h, may be set as a speed at which distraction controls are enabled. This could be based on OEM specifications, local or national regulations, etc.

In this illustrative embodiment, a switch is provided that will simulate a vehicle being above or below a threshold distraction speed 215. This can be useful to ensure that system features are not improperly enabled when they should not be.

In a simple model, there may be a threshold speed at which distraction controls are enabled or disabled. In more complex modeling, it may be possible to monitor various distractions presented to a driver, or to determine a practical driver workload. In other words, given a number of variables (time of day, road conditions, traffic, weather, etc.) a system may dynamically determine if a driver should be able to access certain optional features. To account for such a system, a dial could be used, for example, to dial up and down a practical driver workload level. A digital output could also be included to represent a current state of the dial.

More complex modeling of driver distraction is also envisioned, along with more complex modeling of other vehicle systems. For example, if there were five variables accounting for a calculation of a practical driver workload level, five switches could be used to model this factor. Or, for example, dials could be included to "accelerate/decelerate" a simulated vehicle (as opposed to simply toggling between a distraction level speed and a non-distraction level speed). In this embodiment, however, the switches are left in a relatively simple state for ease of explanation and use in examples.

A variety of unassigned switches may also be included 217, 223, 225, 227, for use in implementing additional vehicle systems or controls. In this example, the switches are provided as examples of additional assignable switches.

The TDK may also include a 911 supported switch 219. In various vehicles, 911 assist functionality may vary based on vehicle settings, restraint control module (RCM) settings, user options and vehicle functionality. This switch can be toggled to represent a vehicle whose 911 assist settings are not properly configured, and a vehicle whose settings are properly configured (thus enabling 911 assist). This switch can be used in conjunction with, for example, a 911 activate switch 221. If the activate switch is activated, a "crash" is simulated over a vehicle network feed or other data channel. If the 911 supported switch is set to a state where the functionality is disabled, an error message to a user may result. If the 911 supported switch is set to a state where the functionality is enabled, the VCS may attempt to place a simulated emergency call or deploy other emergency response functionality.

One or more additional configurations may be included with the 911 activate switch 221. For example, in this embodiment, if the switch is activated three times in two seconds, it will cause a signal simulating a vehicle crash to be sent to the attached VCS. Other activation of the switch may simply cause the system to attempt to place a 911 call (simulated, if desired). This can allow testing of both general call functionality and response under simulated accident conditions functionality.

Also, in this illustrative example, the TDK includes a number of inputs that correspond to steering wheel controls. These help represent user initiated input to the simulated environment, and can allow testing of applications simulating user interaction with a system. Included in this embodiment are, for example, volume controls 229. Activation of these controls can serve to adjust output volume up and down.

The TDK also includes seek controls 231, similar to the volume controls. In this embodiment, activation of these controls causes a seek up or seek down signal to be sent to a tuner. It may be the case that controls, such as, but not limited to, the seek controls 231, have a different enabled functionality when one or more aspects of a VCS are enabled. For example, without limitation, a seek up may correspond to a first selection, and a seek down may correspond to a second selection. If this functionality is enabled on the VCS, pressing the appropriate seek control may cause a signal that is interpretable by the VCS as needed (e.g., a seek signal, that the VCS can interpret as a control signal) to be sent to the VCS from the TDK (or, for example, over a bus).

This illustrative system also includes a media switch 241. Toggling this switch, in this example, can switch between an active media source (e.g., without limitation, FM, Satellite, Line In, etc.). In this example the switch will rotate between sources upon activation, although, as noted, a dial or other multi-position switch could be implemented if desired.

The illustrative embodiment further include a voice switch 235. This switch can cause activation of a voice prompt, listening for verbal input from a user. In some exemplary vehicle environments, a user may only wish to have voice input enabled when the user knows that it is a suitable time to speak (e.g., the environment is quiet). Accordingly, a vehicle may be equipped with a button signaling verbal input is incoming. Toggling this switch can simulate activation of the verbal input button.

This illustrative example also includes two navigation-related switches 237 and 239. In this illustrative example, the navigation switches can be activated in a system utilizing a navigation enabled VCS, both to send requests for navigation instructions 237 and to end a navigation session 239.

Also, in this example, an "ok" switch 243 may be provided. The switch, in this example, can be used as a "confirmation" switch corresponding to a user pressing a confirmation control in a vehicle. This switch can be used to, for example, choose a menu selection, pause audio, confirm an application action, etc.

The system also includes a phone switch 245. Activating this switch can serve to set a phone as a primary source for, for example, input. Once activated, the system can use the phone as an input for commands, so a user can use voice commands for the phone. Enabling this feature may also require, for example, activation of a "voice" or "menu" command on the VCS to instruct the computer to use the phone.

One or more USB inputs 247, 249 may be included with the system to simulate USB inputs provided in the vehicle. In this example, the input 247 corresponds to a primary USB input such as, for example, a front seat, center console input. The second USB input 249, may relate to a USB input provided in a rear seat entertainment module, and may only be useful in situations simulating a vehicle with such an input.

There may also be a line-in input 251, that corresponds to a line-in input for utilizing, for example, an auxiliary audio device in conjunction with the system. Finally, in this example, a microphone is provided 253. This microphone can correspond to a vehicle microphone, usable for input of commands or other verbal input to an application or module as requested by the particular embodiment.

Although a number of vehicle controls and inputs have been simulated, these are representative of exemplary controls and inputs and are not intended to be limiting in any fashion. Any suitable vehicle control or input can be simulated and are contemplated to be within the scope of the invention.

Figure 3:
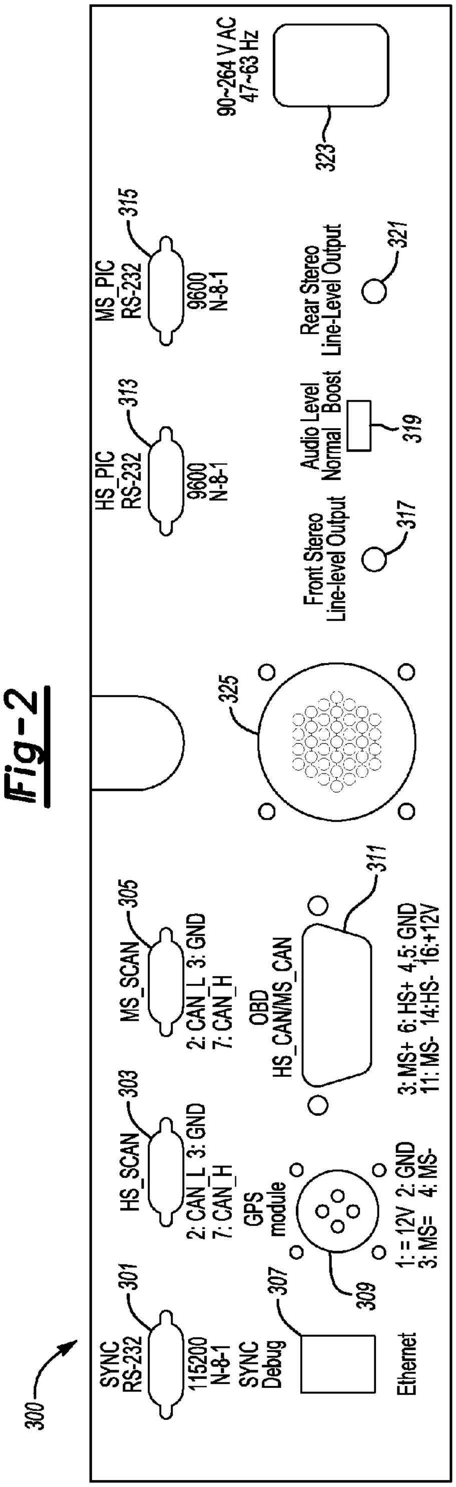
FIG. 3 shows an illustrative series of technology development inputs.

FIG. 3 shows an illustrative series of technology development inputs and outputs for use with an illustrative TDK. In this illustrative example, the system includes a VCS serial output 301. The output can be used to monitor messages generated by a VCS and measured using, for example, a hyper terminal.

Serial connections 303 and 305, in this example, may be used to provide output from MS_TDK modules and HS_TDK modules. These ports can be used to monitor, for example, MS_TDK and HS_TDK simulation software. The system may also include an Ethernet connection 307 for Ethernet communication with a VCS module. One of the system inputs in this example includes a GPS input 309. This can be used to connect an external GPS module to provide navigation information and controls to the system.

The system may additionally include front stereo and rear stereo outputs 317, 321. These outputs can be used to monitor audio that would be produced over the various outputs from the VCS. For example, a system voice may only be intended to be reproduced over a front level output, and the developer may wish to ensure that any dedicated front or rear audio is only coming from the intended outputs.

Also, the exemplary system may include an audio level control 319. This control can be used, for example, to configure a system designed for use with a variable line audio output or a power audio output. For example, a TDK may be generally configured to work with VCS systems that are designed for variable line-level audio output. But, if the system is a system configured to drive speakers directly, the developer can change the setting of this switch to accommodate the change.

The system may also include HS_CAN and MS_CAN inputs 313 and 315. These can be used to connect Can bus inputs for sending bus signals into the system. Numerous vehicle systems report data over vehicle CAN networks when a vehicle is operational. Certain modules and software applications may be designed to interact with one or more vehicle signals. Because the system is not installed in an actual vehicle, replication of these signals from an outside source may be needed. Simulation software can be connected to these inputs to simulate the passing of various signals, which would have been created based on changes in vehicle states and sensors. The signals can then be relayed to the VCS for processing in accordance with the respective applications or modules.

The system also includes an ODB data port 311. This is similar to an ODB data port in a vehicle and allows connection of ODB diagnostic devices. Previously developed vehicle diagnostic tools can be used to register changes in the virtual environment through this port.

Also, the system includes a power connection 323 and a data connection 325 for connection with a vehicle computing system. By connecting a vehicle computing system module to the virtual vehicle environment creatable by the TDK, a developer can test thousands of iterations of vehicle variables on a newly developed application or module.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus comprising:

a plurality of first inputs, corresponding to changeable vehicle state variables, manipuable to simulate changes in vehicle state;

a plurality of second inputs, corresponding to vehicle system controls, manipuable to simulate activation of vehicle controls;

one or more bus inputs, configured to receive vehicle CAN bus signals;

one or more bus outputs, configured to output vehicle CAN bus signals; and a communication connection, configured to connect to a vehicle computing system module (VCSM) and to provide and receive signals from the VCSM allowing for testing of hardware and software in conjunction with the VCSM under various vehicle environments.

2. The apparatus of claim 1, wherein a first input corresponds to a door state.

3. The apparatus of claim 1, wherein a first input corresponds to an ignition state.

4. The apparatus of claim 1, wherein a first input corresponds to a gear state.

5. The apparatus of claim 1, wherein a first input corresponds to a distraction speed state.

6. The apparatus of claim 1, further including one or more CAN bus controls, manipuable to activate/deactivate CAN bus signal output to the VCSM.

7. The apparatus of claim 1, wherein a first input corresponds to an emergency system enablement state.

8. The apparatus of claim 1, wherein a first input corresponds to an accident state.

9. The apparatus of claim 1, wherein a second input corresponds to a vehicle volume control.

10. The apparatus of claim 1, wherein a second input corresponds to a vehicle seek control.

11. The apparatus of claim 1, wherein a second input corresponds to a vehicle voice input activation control.

12. The apparatus of claim 1, wherein a second input corresponds to a vehicle navigation control.

13. The apparatus of claim 1, wherein a second input corresponds to a vehicle system confirmation control.

14. The apparatus of claim 1, further including an ODB data port connector.

15. The apparatus of claim 1, further including front and rear stereo outputs.

16. The apparatus of claim 1, further including a GPS module input configured to connect to an external GPS module.

17. The apparatus of claim 1, further including a microphone input configured to receive voice signals and pass them to the VCSM.

18. The apparatus of claim 1, wherein the first and second controls are physical controls.

19. The apparatus of claim 18, wherein each physical control corresponds to either a vehicle state variable or a vehicle system control.

* * * * *